Feb. 27, 1934.  G. JOHNSON  1,948,665
DRAFT EQUALIZER
Filed May 2, 1931
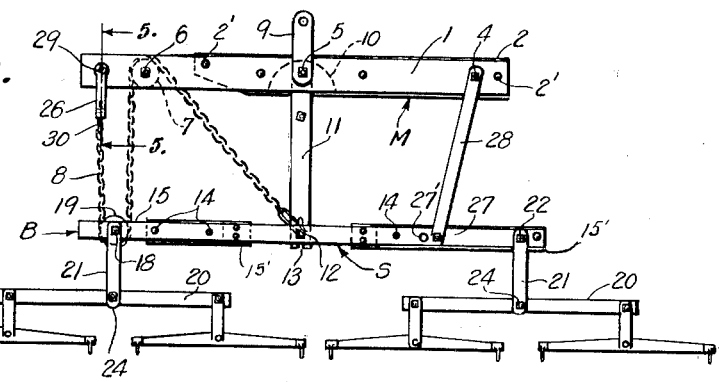
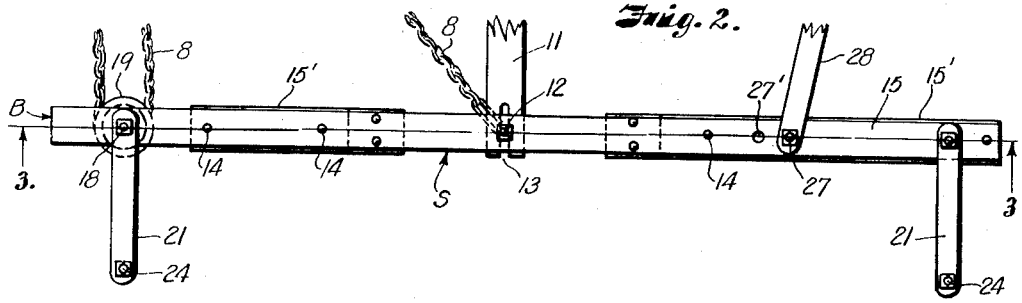
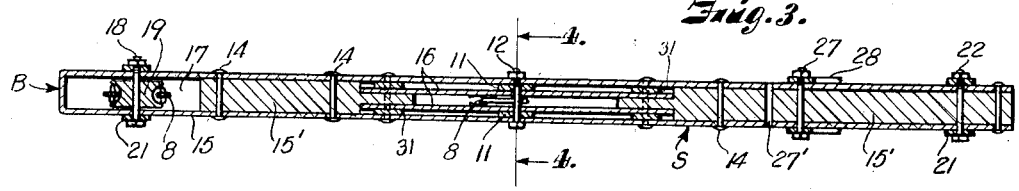
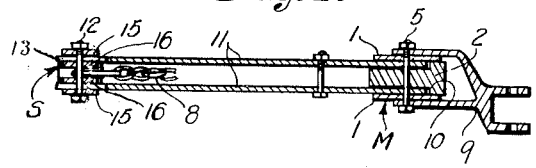
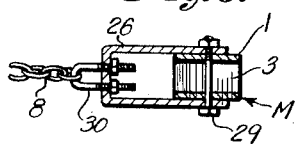
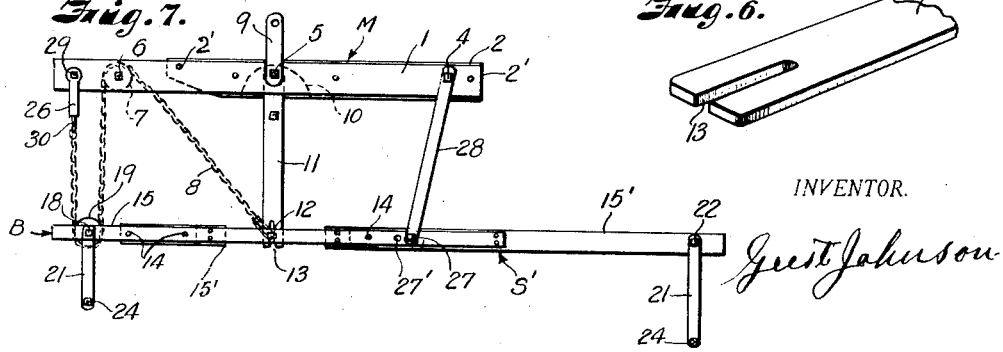
INVENTOR.
Gust Johnson Patented Feb. 27, 1934

1,948,665

UNITED STATES PATENT OFFICE 1,948,665

DRAFT EQUALIZER

Gust Johnson, Independence, Mo.

Application May 2, 1931. Serial No. 534,665

5 Claims. (Cl. 278—8)

The present invention relates to draft equalizers, and aims to provide an improved evener arrangement adapted for use either as a four-horse or three-horse draft equalizing means and operating in an improved and more efficient manner for this purpose.

Accordingly, the present improved construction comprises a novel evener arrangement particularly designed for use with agricultural implements, such as plows, binders, etc., with a view to equalizing the draft and overcoming side draft, and especially designed to enable the draft animals to be hitched closer to the plow or other implement than is possible with equalizers covered by previous patents issued to me.

With these general objects in view the improved equalizer comprises various novel features of arrangement and construction which will now be described in detail with reference to the accompanying drawing in which Figure 1 is a plan view illustrating a draft equalizer embodying the proposed features of improvement;

Figure 2 is a similar view on an enlarged scale of the forward portion of the equalizer;

Figure 3 is a longitudinal section, representing a section taken on the line 3—3 of Figure 2;

Figure 4 is a transverse section on the line 4—4 of Figure 3;

Figure 5 is an enlarged detail sectional view taken on the line 5—5 of Figure 1;

Figure 6 is an enlarged perspective detail of a portion of one of the arms connecting the main and supplemental evener members; and Figure 7 is a plan view illustrating the construction as adapted for a three-horse equalizer.

The present application is directed to certain improvements over the construction shown in my prior Patent No. 1,663,270, dated March 20, 1928. Similar reference numbers will be employed to designate corresponding parts of said patent and this application.

As illustrated in the drawing, the main equalizing member M is comprised of a continuous metallic plate 1 folded to provide top and bottom facings $a$ for a beam 2 and secured thereto by rivets 2', and leaving an open space or boxing 3 adjacent to one end of the beam 2 (Figure 5). Adjacent to one end of the equalizing member M is a pivot bolt 4, while intermediate its ends said member M is provided with a bolt 5 for attachment of the clevis member 9 forming the hitch connection with the plow or other implement. Adjacent to the other end of the member M is provided another bolt 29 for the attachment of a clevis 26 to which is attached, by means of a U-bolt 30, one end of a chain 8 operating around a pulley 7 journaled on a bolt 6 within the boxing 3. The other end of the chain 8 is attached to a bolt 12 provided at one side of the center of an auxiliary or supplemental equalizing member S comprising a continuous metallic plate 15 folded to provide an end boxing 17 as well as top and bottom facings for the the two wood beam sections 15' on opposite sides of the bolt 12, and secured to said sections by rivets 14. The inner ends of these beam sections are mortised to form tongues 15'' for mounting a pair of metallic strips or plates 16 in spaced relation to each other (by means of spacing washers 31) as well as to the upper and lower layers of the plate 15 (see Figures 3 and 4); this arrangement is for the purpose of providing openings or pockets for the attachment of the chain 8 to said bolt 12, and also for the forward ends of a pair of bars 11 having end slots 13 for engagement with said bolt.

The rear ends of said connecting bars 11 are attached to the bolt 5 within pockets or recesses 10 formed in the adjacent upper and lower faces of the beam 2.

The chain 8 is also passed around a pulley 19 journaled on a bolt 18 within said boxing 17, to the ends of which bolt are attached strap links 21 provided with a bolt 24 for connection with one of the doubletrees 20. The other end of the supplemental equalizer S is also provided with a bolt 22 for attachment of strap links 21 provided with a bolt 24 for connection with the other doubletree 20.

To the ends of the bolt 4 are pivoted the ends of plates or bars 28 which are pivotally connected at their other ends to the upper and lower ends of a bolt 27 carried by the supplemental member S which is provided with a plurality of bolt openings 27' for adjustable connection of the bars 28.

As an example of suitable proportions for the operating parts, assuming a given length for the shorter arm of the auxiliary evener member S, the distances between the bolts 5 and 6, and the bolts 5 and 12, will be one-sixth less than the distance between the bolts 12 and 18; the distance between the bolts 12 and 22 one-sixth greater, and between the bolts 5 and 4 one-twelfth less, whereas the distance between the bolts 12 and 27 is one-quarter less, and between the bolt 12 and the bolt opening 27' shown will be one-third less than the distance between bolts 12 and 18, the distance between bolts 5 and 29 being $\frac{1}{12}$ greater than between bolts 12 and 18.

The foregoing construction provides a draft appliance having several advantages in the way of improvement over the device of my prior patent. In addition to affording all the desired draft equalizing functions, it accomplishes the same in a more efficient manner and the arrangement of the chain 8 and its pulleys enables the main and supplemental equalizer members to be coupled closer together, thus bringing the draft animals closer to the plow.

Moreover the manner of mounting the pulley 7 is a marked improvement over my former construction, since it eliminates the use of the pulley on the strap connections to the doubletree and results in a better operation of the chain and pulley connections, with a smoother and more even action of the equalizer.

This insures a more accurate and uniform operation of the equalizer construction as a whole, and any adjustment necessary may be readily attended to by taking up the chain at the bolt 12 or the connection 30, such adjustment being permitted by the slots 13 in the bars 11. If desired, the chain may also be connected to the bolt 27, following the arrangement shown in my Patent 1,734,436, dated November 5, 1929, in which case the bolt will be shifted to the other opening 27'.

The construction is adapted for use also as a three-horse evener as illustrated in the view shown in Figure 7. The sizes of the several parts may be relatively smaller for this purpose and one of the wood beam sections 15' of the supplemental equalizer member is made sufficiently longer for attachment of the straps 21' of the corresponding singletree as shown. In such an arrangement the length of the longer arm of the auxiliary evener member S' is increased by one-half the distance between the bolts 22 and 18 of the member S.

It will thus be seen that I have devised a practical and efficient construction for embodying the various features of my improvements, and while I have shown and described what I now regard as the preferred construction I desire to reserve the right to make all such changes or modifications which may fairly fall within the scope of the following claims.

Having described my invention what I claim as new and desire to secure by Letters Patent is:

1. A draft equalizer comprising main and auxiliary evener member, means pivotally connecting the center of the main evener member with an eccentric point of the auxiliary member and slidable in the latter, pulleys carried by corresponding arms of said members on the same side of said connecting means, an equalizing chain operating around said pulleys, one end of said chain being connected to the main evener member outside of the pulley and the other end of the chain being connected at the eccentric point of the auxiliary member, and means pivotally connecting the other arms of said evener members.

2. A draft equalizer comprising a main evener member, an auxiliary evener member in advance of the main evener member, means pivotally connecting the center of the main member with an eccentric point of the auxiliary member and slidable in the latter, draft equalizing means comprising a pulley journaled on the shorter arm of said auxiliary member and a pulley carried by the outer end of the corresponding arm of the main evener member together with a chain operating around said pulleys and having its ends connected outside the pulley of the main evener member and to the auxiliary member respectively, and spacing means pivotally connecting the other arms of said evener members.

3. A draft equalizer comprising main and auxiliary evener members, spacing means pivotally connecting the center of the main evener member with an eccentric point of the auxiliary member and slidable in the latter, pulleys carried by corresponding arms of said members, a chain operating around said pulleys, one end of said chain being connected to the main evener member and the other end of the chain being connected to the arm on the opposite side of the eccentric point of the auxiliary member from the arm carrying the pulley, and spacing means pivotally connecting the other arms of said evener members.

4. A draft equalizer comprising a main evener member, an auxiliary evener member in advance of the main evener member and provided with an eccentrically located pivotal bolt, a pair of connector bars centrally pivoted on the main evener member, said auxiliary member being formed with a pocket structure surrounding said bolt and providing upper and lower recesses for the forward ends of said bars and a third recess intermediate said first recesses, a slot formed in the end of said connector bars to receive said bolt, whereby transverse movement of said forward evener is permitted as the same is supported by the bars, draft equalizing means comprising a pulley journaled on the shorter arm of the auxiliary member and a pulley carried by the outer end of the corresponding arm of the main evener member, a chain operating around said pulleys and having one end connected outside the pulley on the main evener member and its other end to said bolt within said third recess and spacing bars pivotally connecting the other arms of said evener members.

5. A draft equalizer comprising a main evener member, an auxiliary evener member in advance of the main evener member, means pivotally connecting the center of the main member with an eccentric point of the auxiliary member, and slidable in the latter, pulleys mounted on corresponding arms of the evener members, a chain operating around said pulleys and having one end connected outside the pulley on the main evener member and its other end connected at the eccentric point of the auxiliary member, and spacing means pivotally connecting the other arms of said evener members, draft connections on the short and long arms of the auxiliary member, assuming a distance between the eccentric point and the pulley mounting on the auxiliary member, the distance between the eccentric point and the draft connection on the long arm will be one sixth greater than the assumed distance, the distance between the center point of the main evener member and the pivot point of the spacing means on the main member will be one twelfth less than the assumed distance, the distance between the eccentric point and the pivot point of the spacing means on the long arm of the auxiliary member will be one fourth less than the assumed distance, the distance between the center point of the main member and the point of attachment of the flexible member will be one twelfth greater than the assumed distance, and the distance between the center point and the pulley mounting of the main evener member will be one sixth less than the assumed distance, the distance between the center point of the main evener member and the eccentric point on the auxiliary member will be one sixth less than the assumed distance.

GUST JOHNSON.